United States Patent
Ono et al.

(10) Patent No.: US 11,118,811 B2
(45) Date of Patent: Sep. 14, 2021

(54) HEAT SOURCE DEVICE

(71) Applicant: RINNAI CORPORATION, Aichi (JP)

(72) Inventors: Takahiro Ono, Aichi (JP); Takashi Ojiro, Aichi (JP)

(73) Assignee: RINNAI CORPORATION, Aichi (JP)

( * ) Notice: Subject to any disclaimer, the term of this patent is extended or adjusted under 35 U.S.C. 154(b) by 20 days.

(21) Appl. No.: 16/708,802

(22) Filed: Dec. 10, 2019

(65) Prior Publication Data
US 2020/0191436 A1  Jun. 18, 2020

(30) Foreign Application Priority Data

Dec. 14, 2018 (JP) .............................. JP2018-234021

(51) Int. Cl.
| | |
|---|---|
| *F28F 3/00* | (2006.01) |
| *F24H 1/41* | (2006.01) |
| *F24H 8/00* | (2006.01) |
| *F24H 9/18* | (2006.01) |
| *F28D 9/00* | (2006.01) |
| *F28D 21/00* | (2006.01) |
| *F24H 1/44* | (2006.01) |
| *F24H 1/32* | (2006.01) |
| *F24H 1/34* | (2006.01) |
| *F24H 1/14* | (2006.01) |

(52) U.S. Cl.
CPC ............. *F24H 8/00* (2013.01); *F24H 9/1836* (2013.01); *F24H 1/145* (2013.01); *F24H 1/32* (2013.01); *F24H 1/34* (2013.01); *F24H 1/445* (2013.01); *F28D 9/0043* (2013.01); *F28D 2021/0024* (2013.01)

(58) Field of Classification Search
CPC ...... F28F 3/00; F28F 3/04; F28F 3/005; F28F 3/08; F28D 9/02; F24H 9/0026; F24H 9/0015; F24H 1/34; F24H 1/403; F24H 1/41; F24H 1/24
See application file for complete search history.

(56) References Cited

U.S. PATENT DOCUMENTS

| | | | | |
|---|---|---|---|---|
| 4,502,626 A | * | 3/1985 | Gerstmann | ............... F28D 7/02 122/44.2 |
| 4,972,679 A | * | 11/1990 | Petty | ....................... F25B 33/00 62/238.3 |
| 6,948,455 B2 | * | 9/2005 | Ferguson | ................... F24H 1/40 122/367.1 |
| 7,523,721 B2 | * | 4/2009 | Hamada | .................... F24H 1/43 122/31.1 |

(Continued)

FOREIGN PATENT DOCUMENTS

KR        10-1608149        3/2016

*Primary Examiner* — Gregory A Wilson
(74) *Attorney, Agent, or Firm* — Wenderoth, Lind & Ponack, L.L.P.

(57) ABSTRACT

A heat source device comprising: a combustion chamber (2) provided between a burner (31) and a heat exchanger (1); an inlet pipe (20) for allowing a fluid to be heated to flow in the heat exchanger (1); an outlet pipe (21) for allowing the fluid to be heated to flow out from the heat exchanger (1); and a winding pipe (27) wound around an outer surface of a peripheral wall of the combustion chamber (2), wherein either the inlet pipe (20) or the outlet pipe (21) has an orifice (91) for throttling a fluid flow path of the fluid to be heated flowing in the inlet pipe (20) or the outlet pipe (21).

3 Claims, 6 Drawing Sheets

(56) References Cited

U.S. PATENT DOCUMENTS

| | | | |
|---|---|---|---|
| 7,617,802 B2 * | 11/2009 | Le Mer | F24H 8/00 |
| | | | 122/18.1 |
| 10,527,279 B2 * | 1/2020 | Ojiro | F24H 9/1836 |
| 10,890,356 B2 * | 1/2021 | Shiotsu | F24H 9/0026 |
| 2016/0341447 A1 * | 11/2016 | Wyatt | F28D 7/024 |
| 2017/0184350 A1 | 6/2017 | Choi et al. | |
| 2019/0154366 A1 * | 5/2019 | Mueller | F28D 1/00 |

\* cited by examiner

HEAT SOURCE DEVICE

FIELD OF THE INVENTION

The present invention relates to a heat source device configured to supply combustion exhaust gas generated by a burner to a heat exchanger through a combustion chamber. Especially, the present invention relates to the heat source device having a winding pipe wound around an outer surface of a peripheral wall of the combustion chamber.

DESCRIPTION OF THE RELATED ART

Conventionally, a heat exchanger including a stacked body formed by stacking a plurality of heat exchange units in which an upper heat exchange plate and a lower heat exchange plate are joined has been proposed (for example, Korean Patent No. 10-1608149 B). Each of the heat exchange units has an internal space through which a fluid to be heated flows between the upper heat exchange plate and the lower heat exchange plate, and a plurality of gas vents penetrating the internal space in a non-communicating state and through which combustion exhaust gas from a burner passes in a vertical direction.

Further, the present applicant has proposed a heat source device having an inlet pipe and an outlet pipe provided so as to protrude downward from a heat exchanger and a winding pipe connected to the inlet pipe and the outlet pipe and wound around an outer surface of a peripheral wall of a combustion chamber so as to bypass the heat exchanger (Japanese Patent Application No. 2018-82164). According to the heat source device, part of a fluid to be heated flowing in the inlet pipe flows into the winding pipe wound around the outer surface of the peripheral wall of the combustion chamber in which high heat combustion exhaust gas flows. This allows the fluid to be heated to heat efficiently.

However, in the heat source device above, upstream and downstream ends of the winding pipe are connected to the inlet and outlet pipes, respectively. Thus, part of the fluid to be heated flowing in the inlet pipe is diverted from the inlet pipe to the outlet pipe through the winding pipe without passing through the heat exchanger. Therefore, when a required flow rate required for the heat source device is small, a flow rate of fluid to be heated flowing into the heat exchanger is reduced. Also, the fluid to be heated by the heat exchanger and flowing out to the outlet pipe is cooled by mixing with a low temperature fluid to be diverted from the inlet pipe to the outlet pipe through the winding pipe without passing through the heat exchanger. Therefore, it is necessary to heat the fluid to be heated in the heat exchanger to a temperature higher than a required temperature for the fluid to be heated required for the heat source device. When the heat exchanger is heated to the high temperature while the flow rate of the fluid to be supplied to the heat exchanger is small, the fluid to be heated flowing in the heat exchanger is overheated and local heating is likely to occur. As a result, problems such as boiling or denaturation of the fluid to be heated occur and noise due to boiling noise occurs.

SUMMARY OF THE INVENTION

The present invention has been made to solve the problem described above, and an object of the present invention is to provide a heat source device capable of preventing local heating.

According to the present invention, there is provided a heat source device comprising:

a burner for generating combustion exhaust gas;
a heat exchanger through which the combustion exhaust gas flows;
a combustion chamber provided between the burner and the heat exchanger;
an inlet pipe for allowing a fluid to be heated to flow in the heat exchanger;
an outlet pipe for allowing the fluid to be heated to flow out from the heat exchanger; and
a winding pipe wound around an outer surface of a peripheral wall of the combustion chamber,
wherein either the inlet pipe or the outlet pipe has an orifice configured to throttle a fluid flow path of the fluid to be flowing in the inlet pipe or the outlet pipe,
an upstream end of the winding pipe communicates with an upstream branch provided on an upstream side of the orifice in the inlet pipe or the outlet pipe, and
a downstream end of the winding pipe communicates with a downstream branch provided on a downstream side of the orifice in the inlet pipe or the outlet pipe.

Other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

First Embodiment

Figure 1:
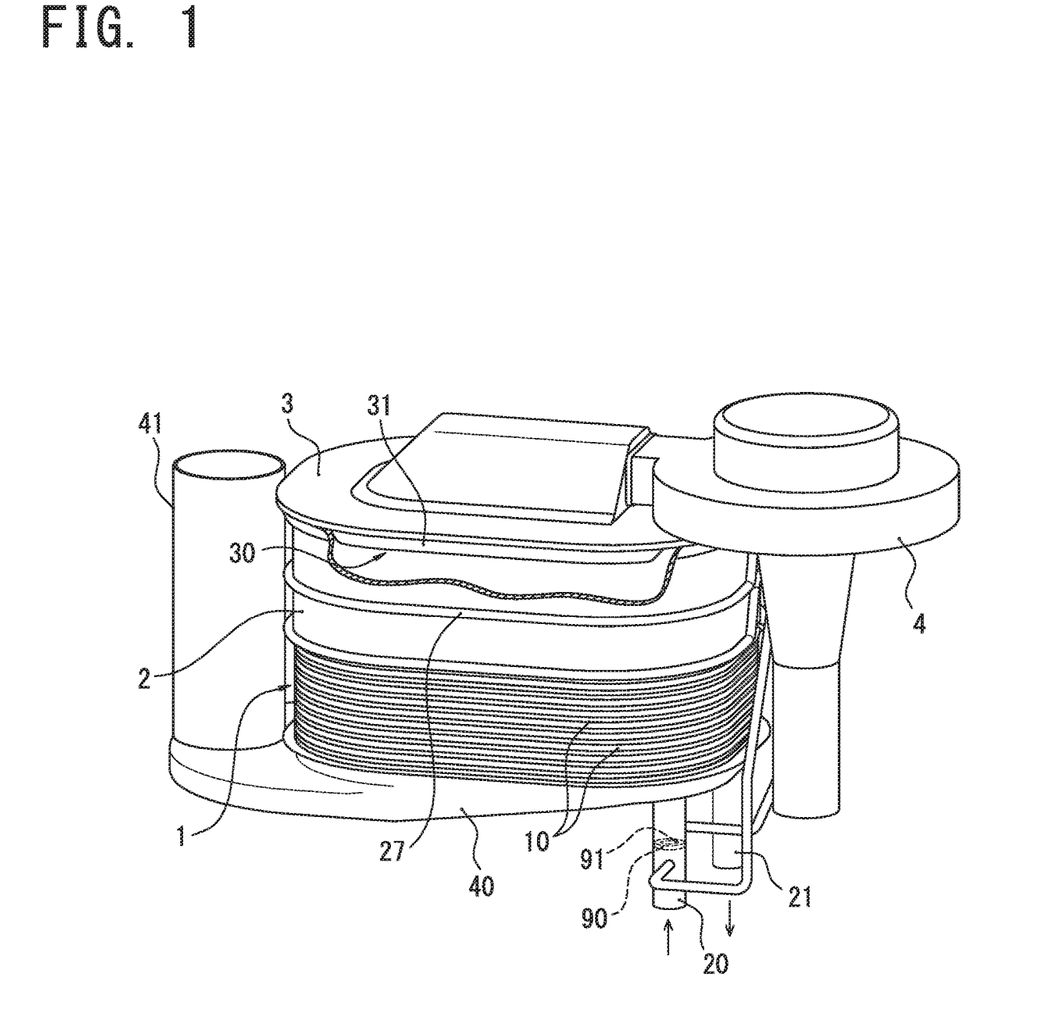
FIG. 1 is a schematic partial cut-away perspective view showing a heat source device according to a first embodiment of the present invention.

Hereinafter, referring to drawings, a heat source device according to an embodiment of the present invention will be described in detail. As illustrated in FIG. 1, a heat source device according to the present embodiment is a water heater that heats water (a fluid to be heated) flowing into a heat exchanger 1 from an inlet pipe 20 by combustion exhaust gas generated by a burner 31, and supplies the heated water to a hot water supplying terminal (not illustrated) such as a faucet or a shower through an outlet pipe 21. Although not shown, the water heater is accommodated in an outer casing. Other heating medium (for example, an antifreezing fluid) as the fluid to be heated may be used.

In this water heater, a burner body 3 constituting an outer shell of the burner 31, a combustion chamber 2, the heat exchanger 1, and a drain receiver 40 are disposed in order from the top. Additionally, a fan case 4 housing a combustion fan for feeding a mixture gas of fuel gas and air into the burner body 3 is disposed on one side (a right side in FIG. 1) of the burner body 3. Further, an exhaust duct 41 communicating with the drain receiver 40 is disposed on another side (a left side in FIG. 1) of the burner body 3. The combustion exhaust gas flowing out to the drain receiver 40 is discharged to an outside of the water heater through the exhaust duct 41.

In this specification, when the water heater is viewed in a state where the fan case 4 and the exhaust duct 41 are disposed on the sides of the burner body 3, a depth direction corresponds to a front-rear direction, a width direction corresponds to a left-right direction, and a height direction corresponds to a vertical direction.

The burner body 3 has a substantially oval shape in a plane view. The burner body 3 is made of stainless steel-based metal, for example. Although not shown, the burner body 3 opens downward.

An introducing unit communicating with the fan case 4 projects upward from a center of the burner body 3. The burner body 3 includes the flat burner 31 having a downward combustion surface 30. The mixture gas is supplied to the burner body 3 by rotating the combustion fan.

The burner 31 is of all primary air combustion type. The burner 31 includes a ceramic combustion plate having many flame ports opening downwardly (not shown) or a combustion mat made by knitting metal fabric woven like net. The mixture gas supplied into the burner body 3 is jetted downward from the downward combustion surface 30 by supply pressure of the combustion fan. By igniting the mixture gas, flame is formed on the combustion surface 30 of the burner 31 and the combustion exhaust gas is generated. Therefore, the combustion exhaust gas ejected from the burner 31 is fed to the heat exchanger 1 via the combustion chamber 2. Then, the combustion exhaust gas having passed through the heat exchanger 1 passes through the drain receiver 40 and the exhaust duct 41 and is discharged to the outside of the water heater.

In other words, in the heat exchanger 1, an upper side where the burner 31 is provided corresponds to an upstream side of a gas flow passage of the combustion exhaust gas, and a lower side opposite to the side provided with the burner 31 corresponds to a downstream side of the gas flow passage of the combustion exhaust gas.

Figure 4:
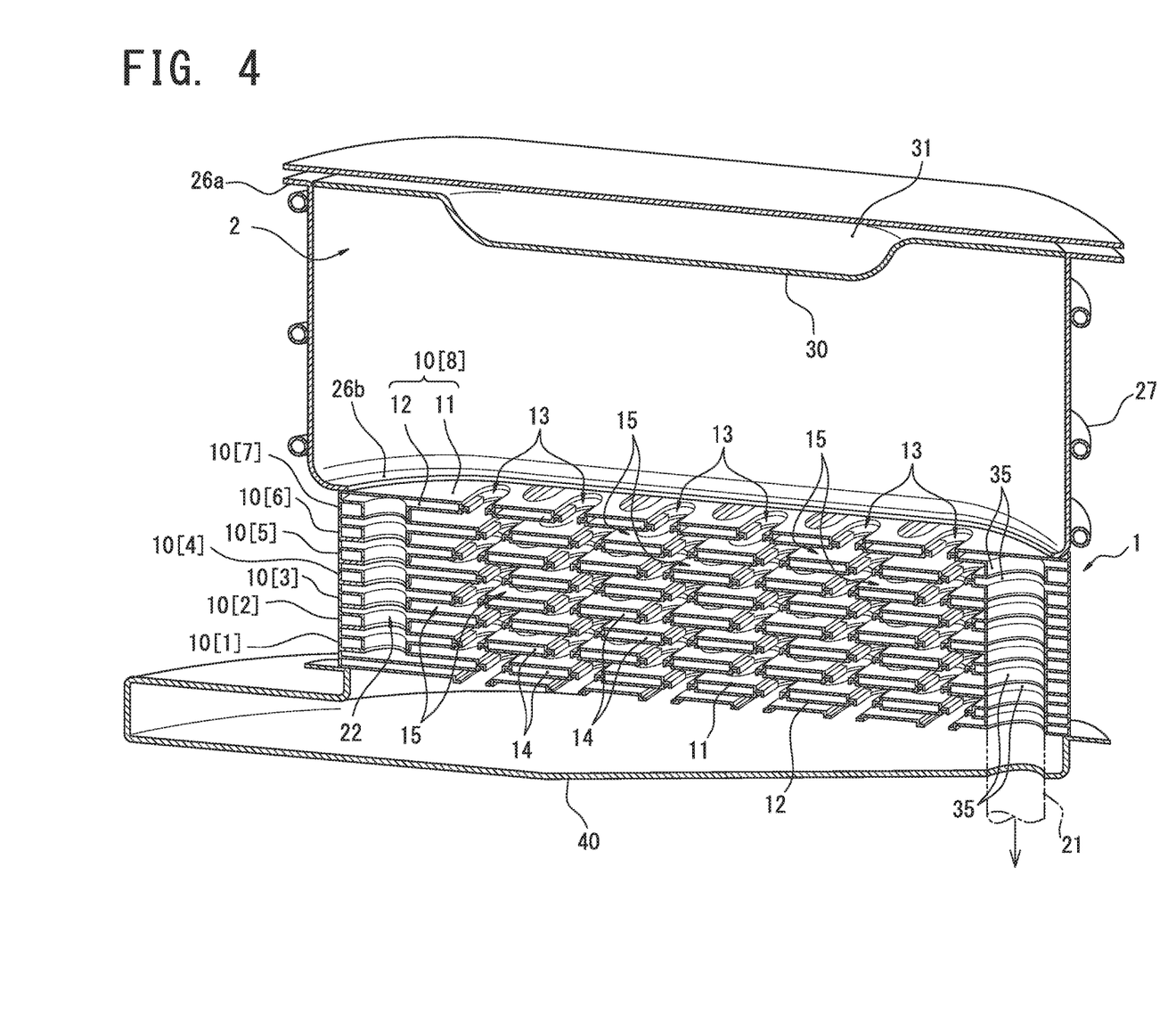
FIG. 4 is a schematic partial cross-sectional perspective view of an outlet pipe side showing the heat source device according to the first embodiment of the present invention.

The combustion chamber 2 has a substantially oval shape in a plane view. The combustion chamber 2 is made of stainless steel-based metal, for example. The combustion chamber 2 having an upper opening and a lower opening is formed by bending one single metal plate having a substantially rectangular shape and joining both ends thereof. As illustrated in FIG. 4, a flange 26a bent outward is formed at an upper end of the combustion chamber 2, and a flange 26b bent inward is formed at a lower end of the combustion chamber 2. These flanges 26a, 26b are respectively joined to a lower surface peripheral edge of the burner body 3 and an upper surface peripheral edge of the heat exchanger 1. A winding pipe 27 for allowing water diverted from the inlet pipe 20 to flow is wound around an outer surface of a peripheral wall of the combustion chamber 2.

Figure 2:
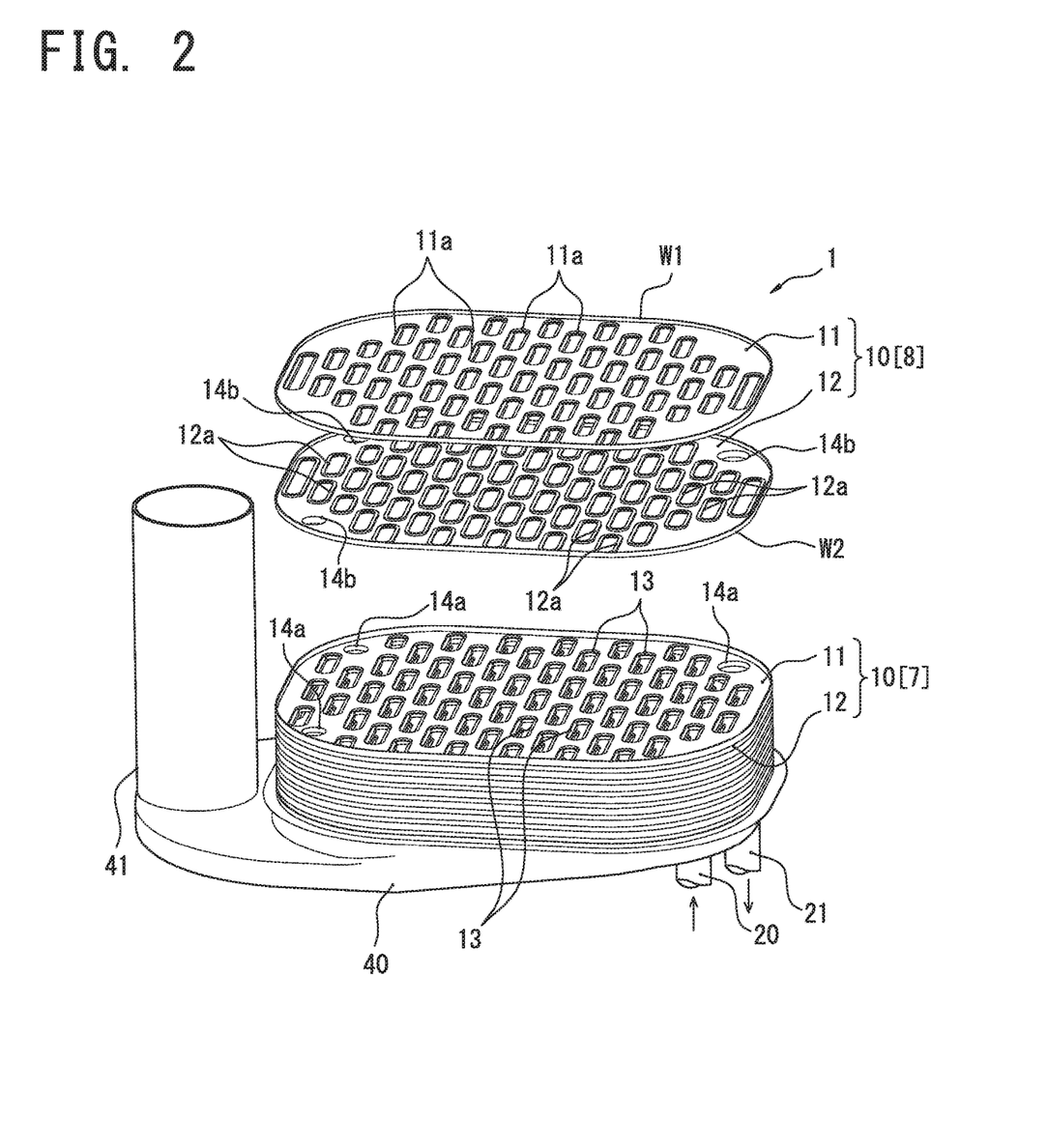
FIG. 2 is a schematic partial exploded perspective view showing a heat exchanger according to the first embodiment of the present invention.
Figure 3:
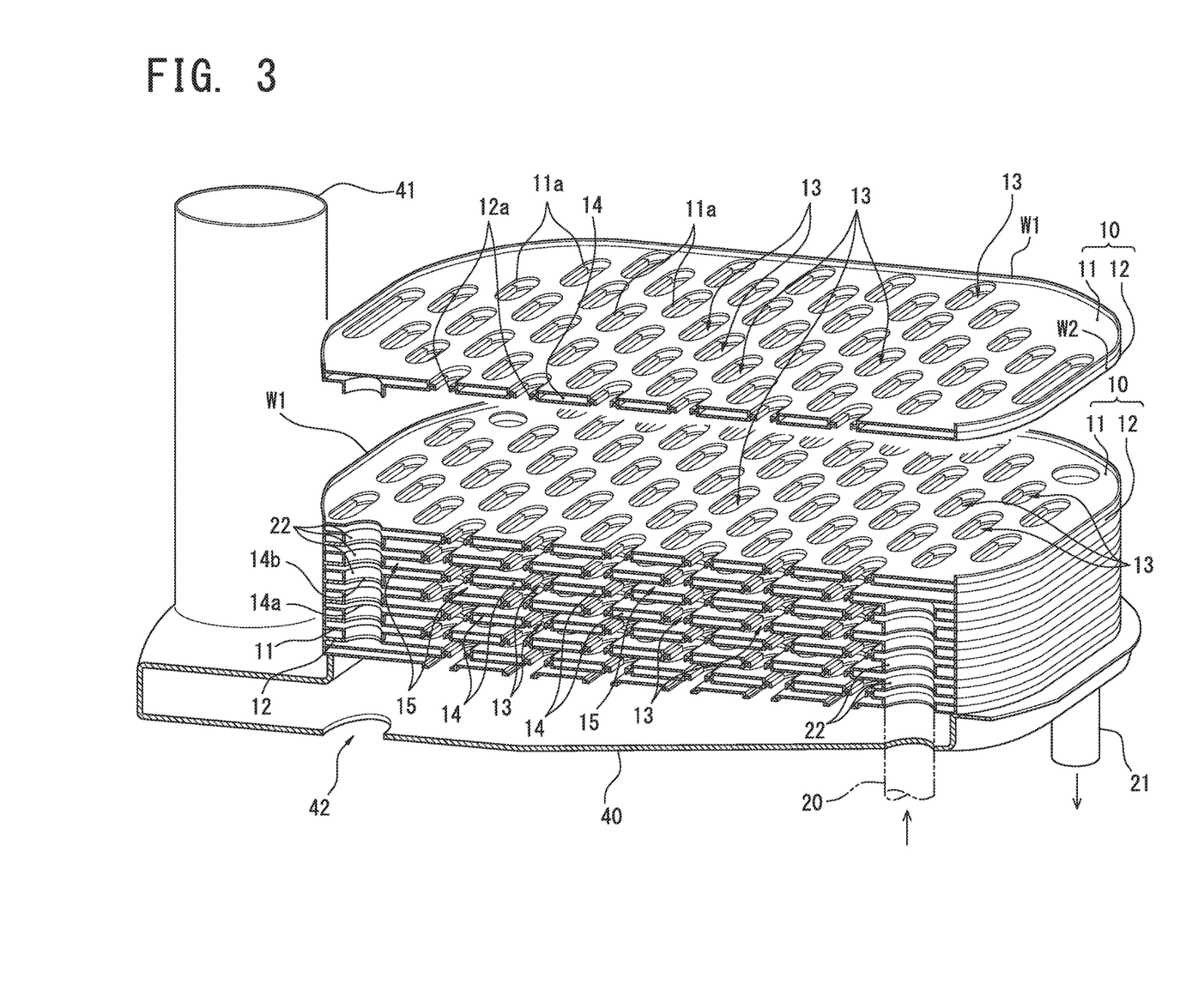
FIG. 3 is a schematic partial cross-sectional perspective view of an inlet pipe side showing the heat source device according to the first embodiment of the present invention.

The heat exchanger 1 has a substantially oval shape in a plane view. As illustrated in FIGS. 2 to 4, the heat exchanger 1 includes a plate-type heat exchanger formed by stacking a plurality of (in this embodiment, eight layers) heat exchange units 10. A number in a square bracket ([ ]) on a right side of the heat exchange unit 10 in these drawings indicates the number of layers from the bottom when a lowermost heat exchange unit 10 is a first layer. The heat exchanger 1 may have a housing surrounding an outer circumference thereof.

Each of the heat exchange units 10 is formed by superimposing a pair of upper and lower heat exchange plates 11, 12 in the vertical direction and joining predetermined portions with brazing material or the like. The upper and lower heat exchange plates 11, 12 of each of the heat exchange units 10 respectively have a common configuration, except that part of configuration such as a position of a gas vent to be described later is different. For clarity sake, the dimensions of elements which are represented in the drawings do not correspond to the actual dimensions, and do not limit the embodiment.

The upper and lower heat exchange plates 11, 12 respectively have a substantially oval shape in a plane view. The upper and lower heat exchange plates 11, 12 are made of stainless steel-based metal, for example. The upper and lower heat exchange plates 11, 12 respectively have a number of substantially elongated hole-shaped upper and lower gas vents 11a, 12a on substantially entire surfaces of the plates except for corners. The upper and lower gas vents 11a, 12a may have other shapes such as circular, respectively.

Further, the upper and lower heat exchange plates 11, 12, except for the upper heat exchange plate 11 of an uppermost heat exchange unit 10, respectively have substantially circular upper and lower through holes 14a, 14b in at least one corner. These upper and lower through holes 14a, 14b are formed by burring so that joints (burring portions) projecting upward or downward from peripheral edges are formed.

The upper and lower gas vents 11a, 12a of the upper and lower heat exchange plates 11, 12 of each of the heat exchange units 10 are provided at positions facing each other. An upper gas vent joint projecting downward is formed at a peripheral portion of the upper gas vent 11a of the upper heat exchange plate 11. Further, a lower gas vent joint fitted with the upper gas vent joint is formed at a peripheral portion of the lower gas vent 12a of the lower heat exchange plate 12. On peripheral edges of the upper and lower heat exchange plates 11, 12, upper and lower peripheral edge joints W1, W2 projecting upward are respectively formed. The upper and lower gas vent joints and the lower peripheral edge joint W2 are set in such a manner that when the upper and lower gas vent joints are joined and the lower peripheral edge joint W2 of the lower heat exchange unit 12 and a bottom surface peripheral edge of the upper heat exchange plate 11 are joined, the upper and lower heat exchange plates 11, 12 are spaced from each other at a gap with a predetermined height.

Further, the upper peripheral edge joint W1 of the upper heat exchange plate 11 is set in such a manner that when the upper peripheral edge joint W1 and a bottom surface peripheral edge of the lower heat exchange plate 12 of an upward adjacent heat exchange unit 10 are joined, the upper heat exchange plate 11 of the lower heat exchange unit 10 and the lower heat exchange plate 12 of the upper heat exchange unit 10 are spaced from each other at a gap with a predetermined height. Therefore, by joining the upper and lower gas vent joints at the peripheral edges of the upper and lower gas vents 11a, 12a of the upper and lower heat exchange plates 11, 12, and by joining the lower peripheral edge joint W2 of the lower heat exchange plate 12 and the bottom surface peripheral edge of the upper heat exchange plate 11, an internal space 14 of a predetermined height and a gas vent 13 penetrating the internal space 14 in a non-communicating state are formed. Furthermore, by joining the plurality of heat exchange units 10, an exhaust space 15 in which the combustion exhaust gas passing through the gas vent 13 flows is formed between vertically adjacent heat exchange units 10. Thus, the combustion exhaust gas generated by the burner 31 flows through the heat exchanger 1 downward from above by passing through the gas vent 13 penetrating the internal space 14 of each of the heat exchange units 10 and the exhaust space 15 formed between the vertically adjacent heat exchange units 10.

As illustrated in FIGS. 3 and 4, some of the upper and lower through holes 14*a*, 14*b* provided at corners of the upper and lower heat exchange plates 11, 12 forming one heat exchange unit 10 are opened so as to communicate with the internal space 14 between the upper and lower heat exchange plates 11, 12. In addition, the upper and lower through holes 14*a*, 14*b* provided at rear corners on a right side of the upper and lower heat exchange plates 11, 12 forming one heat exchange unit 10, except for the uppermost heat exchange unit 10 and a seventh heat exchange unit 10, are opened so as to penetrate the internal space 14 in a non-communicating state by joining the peripheral edges of the upper and lower through holes 14*a*, 14*b* located on a coaxial line. Further, by joining the peripheral edges of the upper and lower through holes 14*a*, 14*b* located on the coaxial line of the vertically adjacent heat exchange units 10, communication paths 22, 35 each penetrating the exhaust space 15 in a non-communicating state are formed. Further, the inlet pipe 20 is connected to the lower through hole 14*b* provided at a front corner on a right side of the lowermost heat exchange unit 10. Further, the outlet pipe 21 is connected to the lower through hole 14*b* provided at a rear corner on the right side of the lowermost heat exchange unit 10. Although not shown, no through hole is formed at front and rear corners on a left side of the lower heat exchange plate 12 forming the lowermost heat exchange unit 10, at a front corner on a right side of the upper heat exchange plate 11 forming a sixth heat exchange unit 10, at front corners on the right side of the upper and lower heat exchange plates 11, 12 forming the seventh heat exchange unit 10, at a front corner on the right side of the lower heat exchange plate 12 forming the uppermost heat exchange unit 10, and at all corners of the upper heat exchange plate 11 forming the uppermost heat exchange unit 10 as described above.

Therefore, water flowing from the inlet pipe 20 into an internal space 14 of the lowermost heat exchange unit 10 sequentially flows into internal spaces 14 of upward adjacent heat exchange units 10 through the communication paths 22. At this time, water flows from the right side to the left side in the internal space 14 of each of the heat exchange units 10 from the lowermost layer to the sixth layer in FIGS. 2 to 4. Further, water flows from the left side to the right side in the internal space 14 of each of the heat exchange units 10 from the seventh layer to the uppermost layer in FIGS. 2 to 4. This allows water to be heated by the combustion exhaust gas flowing in the gas vent 13 and the exhaust space 15 of each of the heat exchange units 10 while water flows upward from below in the heat exchanger 1. Then, water flowing into the internal spaces 14 of the uppermost and seventh heat exchange units 10 flows out to the outlet pipe 21 connected to the lowermost heat exchange unit 10 by passing through the communication path 35 penetrating the internal space 14 in each of the heat exchange units 10 and the exhaust space 15 between the vertically adjacent heat exchange units 10 in the non-communicating state.

Therefore, according to the present embodiment, both the inlet pipe 20 and the outlet pipe 21 protrude downward from the lowermost heat exchange unit 10 on a side opposite to the burner 31 side. As a result, since the inlet pipe 20 and the outlet pipe 21 are not provided between the burner 31 and the heat exchanger 1, the flame of the burner 31 can be prevented from contacting with the inlet pipe 20 and the outlet pipe 21. Further, before the combustion exhaust gas is supplied to the heat exchanger 1, the combustion exhaust gas can be prevented from coming into contact with the inlet pipe 20 and the outlet pipe 21. Therefore, combustion performance and thermal efficiency can be improved.

In the present embodiment, the drain receiver 40 that covers the heat exchanger 1 from below is continuously connected to a lower edge of the heat exchanger 1. The drain receiver 40 is made of stainless steel-based metal, for example. One side end of the drain receiver 40 communicates with the exhaust duct 41. Therefore, the combustion exhaust gas passing through the heat exchanger 1 flows out to the exhaust duct 41 through the drain receiver 40. In addition, a drain discharge port 42 is formed in vicinity of an opening portion, which is open to the exhaust duct 41. The drain discharge port 42 is connected to a drain neutralizer (not shown).

Figure 5:
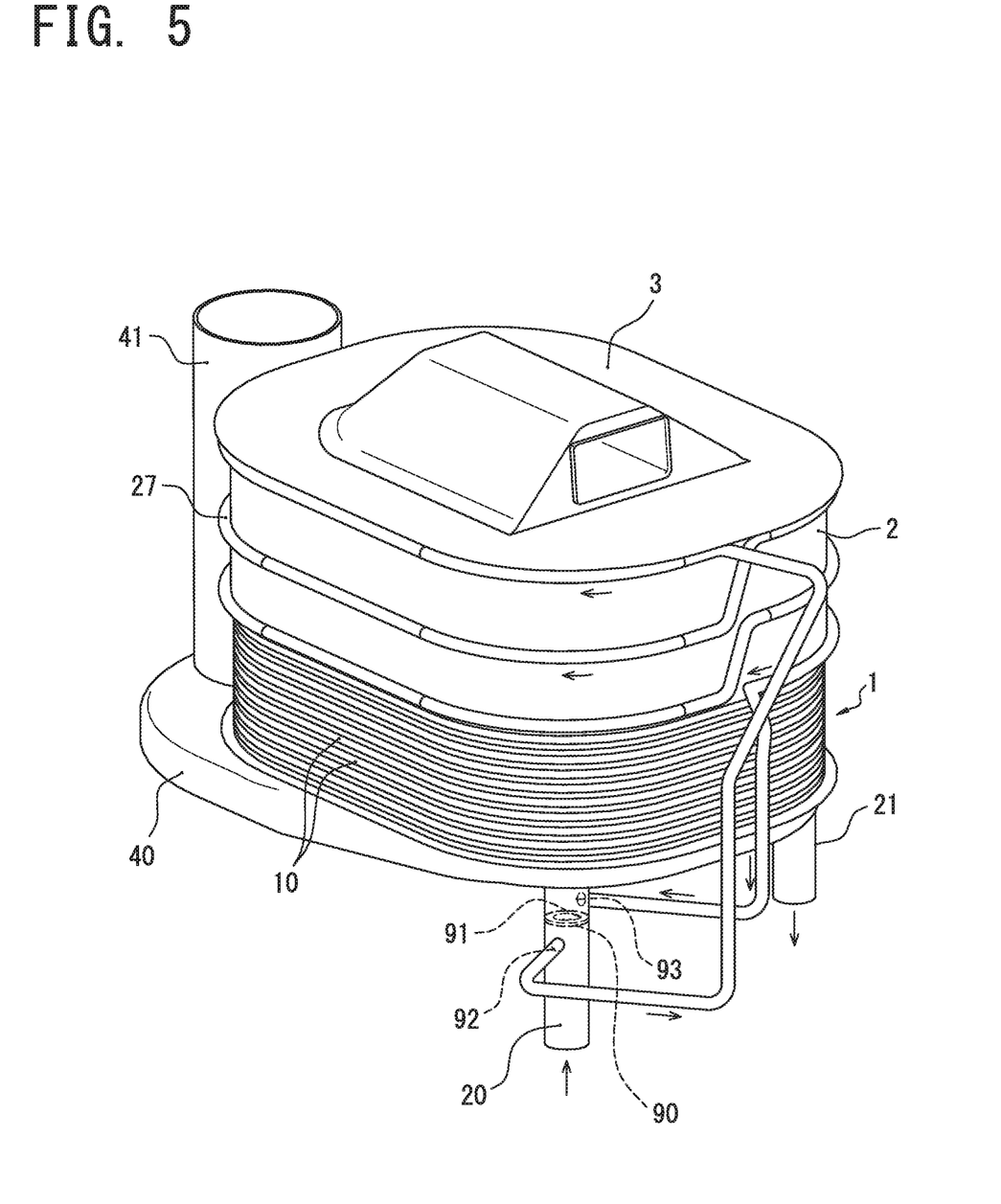
FIG. 5 is a schematic perspective view showing the heat source device according to the first embodiment of the present invention.

The inlet pipe 20 and the outlet pipe 21 penetrate a bottom surface of the drain receiver 40 and extend downward. As illustrated in FIGS. 1 and 5, in the present embodiment, an orifice plate 90 is disposed in the inlet pipe 20 protruding downward from the drain receiver 40, so that an orifice 91 for throttling a fluid flow path for water is formed in the inlet pipe 20. Further, an upstream branch hole (upstream branch) 92 is opened on a pipe wall of the inlet pipe 20 on an upstream side of the fluid flow path for water more than the orifice 91, and an upstream end of the winding pipe 27 is connected to the upstream branch hole 92. Further, a downstream branch hole (downstream branch) 93 is opened on the pipe wall of the inlet pipe 20 on a downstream side of the fluid flow path for water more than the orifice 91, and a downstream end of the winding pipe 27 is connected to the downstream branch hole 93.

Thus, according to the present embodiment, since the orifice plate 90 is disposed in the inlet pipe 20, a pressure difference is created between the upstream and downstream sides of the orifice 91 in the inlet pipe 20 when water flows in the inlet pipe 20. As a result, part of the water flowing in the inlet pipe 20 is diverted from the upstream branch hole 92 on the upstream side of the orifice 91 to the winding pipe 27. Then, the water flowing through the winding pipe 27 returns to the inlet pipe 20 from the downstream branch hole 93 on the downstream side of the orifice 91. Therefore, on the downstream side of the downstream branch hole 93 in the inlet pipe 20, water after joining the water passing through the orifice 91 and the water returning from the winding pipe 27 flows. In other words, the water diverted from the inlet pipe 20 to the winding pipe 27 returns from the winding pipe 27 to the same inlet pipe 20. Therefore, all the water supplied from a water supply source to the inlet pipe 20 flows into the heat exchanger 1. Since the hottest combustion exhaust gas comes into contact with the uppermost heat exchange unit 10, local heating tends to occur in the uppermost heat exchange unit 10. However, according to the heat exchanger 1, it makes possible to flow sufficient water in the internal space 14 of the uppermost heat exchange unit 10. Thereby, even when a required flow rate is small, shortage of a flow rate of water in the heat exchanger 1 can be prevented.

Further, according to the present embodiment, all the water flowing through the inlet pipe 20 is heated by the heat exchanger 1. Therefore, unlike the case where part of water flowing in the inlet pipe 20 is diverted from the inlet pipe 20 to the outlet pipe 21 by bypassing the heat exchanger 1, there is no need to heat water in the heat exchanger 1 to a temperature higher than a water temperature required for the water heater.

Further, according to the present embodiment, the winding pipe 27 is wound around the outer surface of the peripheral wall of the combustion chamber 2 in which the high temperature combustion exhaust gas flow. Thus, water is heated while flowing through the winding pipe 27, and heated water returns to the inlet pipe 20. Therefore, since pre-heated water flows into the heat exchanger 1, water can be efficiently heated. In addition, since low temperature water before being heated by the heat exchanger 1 flows through the winding pipe 27, this can suppress overheating of the peripheral wall of the combustion chamber 2 efficiently.

Therefore, according to the present embodiment, water can be efficiently heated by the heat exchanger 1, and occurrence of local heating can be prevented. Further, the upstream end and the downstream end of the winding pipe 27 are connected to the inlet pipe 20 protruding to the outside from the drain receiver 40. Thus, in the inlet pipe 20 between the heat exchanger 1 and the drain receiver 40, water after joining the water passing through the orifice 91 and the water heated in the winding pipe 27 flows. Therefore, since a temperature of the inlet pipe 20 in the drain receiver 40 becomes high, drain generated when the combustion exhaust gas comes into contact with the inlet pipe 20 can be reduced.

Second Embodiment

Figure 6:
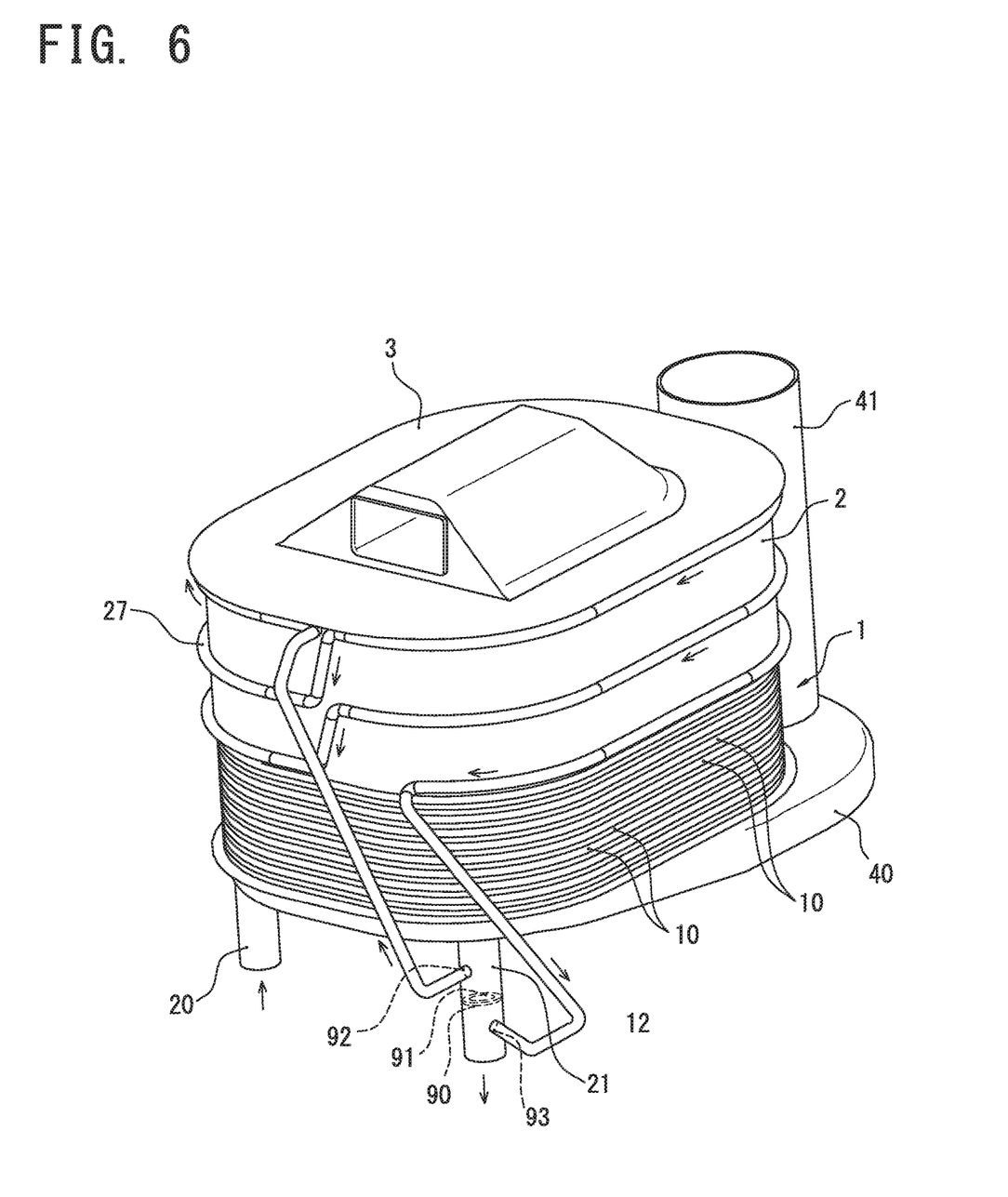
FIG. 6 is a schematic perspective view showing a heat source device according to a second embodiment of the present invention.

A heat source device according to the present embodiment has the same configuration as the first embodiment, except that an orifice plate 90 is disposed in an outlet pipe 20, and that upstream and downstream ends of a winding pipe 27 are connected to an outlet pipe 21. Therefore, common elements are assigned the same reference numerals, and their explanations are omitted.

FIG. 6 is a schematic perspective view showing the heat source device according to the present embodiment. As illustrated in FIG. 6, according to the present embodiment, the orifice plate 90 is disposed in the outlet pipe 21, so that an orifice 91 for throttling a fluid flow path for water is formed in the outlet pipe 21. Further, an upstream branch hole (upstream branch) 92 is opened on a pipe wall of the outlet pipe 21 on an upstream side of the fluid flow path for water more than the orifice 91, and the upstream end of the winding pipe 27 is connected to the upstream branch hole 92. Further, a downstream branch hole (downstream branch) 93 is opened on the pipe wall of the outlet pipe 21 on a downstream side of the fluid flow path for water more than the orifice 91, and the downstream end of the winding pipe 27 is connected to the downstream branch hole 93.

Thus, according to the present embodiment, since the orifice plate 90 is disposed in the outlet pipe 21, a pressure difference is created between the upstream and downstream sides of the orifice 91 in the outlet pipe 21 when water flows in the outlet pipe 21. As a result, part of the water flowing in the outlet pipe 21 is diverted from the upstream branch hole 92 on the upstream side of the fluid flow path for water more than the orifice 91 to the winding pipe 27. Then, the water flowing through the winding pipe 27 returns to the outlet pipe 21 from the downstream branch hole 93 on the downstream side of the fluid flow path for water more than the orifice 91. Therefore, on the downstream side of the fluid flow path for water more than the downstream branch hole 93 in the outlet pipe 21, water after joining the water passing through the orifice 91 and the water returning from the winding pipe 27 flows. A temperature of water flowing out to the outlet pipe 21 from the heat exchanger 1 is lower than a temperature of the peripheral wall of the combustion chamber 2 in which high temperature combustion exhaust gas flows. This allows the water flowing in the winding pipe 27 to heat efficiently.

Further, all the water supplied to the inlet pipe 20 flows into the heat exchanger 1. Therefore, sufficient water flows in an internal space 14 of an uppermost heat exchange unit 10 where local heating tends to occur, in contact with the hottest combustion exhaust gas. Thereby, even when a required flow rate is small, shortage of a flow rate of water in the heat exchanger 1 can be prevented.

In addition, according to the present embodiment, all the water flowing through the inlet pipe 20 is heated by the heat exchanger 1, and part of the water flowing out from the heat exchanger 1 is further heated while flowing in the winding pipe 27. Therefore, unlike the case where part of water flowing in the inlet pipe 20 is diverted from the inlet pipe 20 to the outlet pipe 21 by bypassing the heat exchanger 1, there is no need to heat water in the heat exchanger 1 to a temperature higher than a water temperature required for the water heater. Further, since water having heated by the heat exchanger 1 flows in the winding pipe 27, this can suppress dew condensation generated on an outer side of an outer surface of the winding pipe.

Accordingly, according to the present embodiment, water can be efficiently heated by the heat exchanger 1, and occurrence of local heating can be prevented.

Other Embodiments (1) In the above embodiments, the water heater is used. However, a heat source device such as a boiler may be used.

(2) In the above embodiments, the burner having the downward combustion surface is disposed above the heat exchanger. However, a burner having an upward combustion surface may be disposed below the heat exchanger.

(3) In the above embodiments, the orifice for throttling the fluid flow path for water is formed by the orifice plate disposed in either the inlet pipe or the outlet pipe. However, if an orifice is formed in the inlet pipe or the outlet pipe, formation means therefor is not particularly limited. For example, the inlet pipe or the outlet pipe may be partially throttled to form the orifice. Further, the orifices may be respectively formed in the inlet pipe and the outlet pipe, and a winding pipe connected to the inlet pipe and a winding pipe connected to the outlet pipe may be wound around the outer surface of the combustion chamber.

(4) In the above embodiments, the burner body, the combustion chamber, and the heat exchanger are separate members. However, the burner body and the combustion chamber may be a single integral member, and the combustion chamber and the heat exchanger may be a single integral member.

(5) In the above embodiments, the inlet pipe and the outlet pipe are individual members. However, the inlet pipe and the outlet pipe may be a plurality of members formed by connecting a member connected to the heat exchanger and a member penetrating through the drain receiver, respectively.

As described in detail, the present invention is summarized as follows.

According to one aspect of the present invention, there is provided a heat source device comprising:

a burner for generating combustion exhaust gas;

a heat exchanger through which the combustion exhaust gas flows;

a combustion chamber provided between the burner and the heat exchanger;

an inlet pipe for allowing a fluid to be heated to flow in the heat exchanger;

an outlet pipe for allowing the fluid to be heated to flow out from the heat exchanger; and a winding pipe wound around an outer surface of a peripheral wall of the combustion chamber, wherein either the inlet pipe or the outlet pipe has an orifice configured to throttle a fluid flow path of the fluid to be heated flowing in the inlet pipe or the outlet pipe, an upstream end of the winding pipe communicates with an upstream branch provided on an upstream side of the orifice in the inlet pipe or the outlet pipe, and a downstream end of the winding pipe communicates with a downstream branch provided on a downstream side of the orifice in the inlet pipe or the outlet pipe.

When both ends of the upstream end and the downstream end of the winding pipe communicate with only either the inlet pipe or the outlet pipe, the fluid flow path for allowing the fluid to be heated diverted from the inlet pipe or the outlet pipe to the winding pipe to return to the same inlet pipe or outlet pipe is formed. Therefore, even if only either the inlet pipe or the outlet pipe is communicated with the upstream end and the downstream end of the winding pipe, no pressure difference is created between a branch communicating with the upstream end of the winding pipe and a branch communicating with the downstream end of the winding pipe. As a result, the fluid to be heated is not properly diverted from the inlet pipe or the outlet pipe to the winding pipe.

However, according to the heat source device above, since either the inlet piper or the outlet pipe has the orifice for throttling the fluid flow path of the fluid to be heated flowing in the inlet pipe or the outlet pipe, a pressure difference is created between the upstream and downstream sides of the orifice. Further, since the upstream end of the winding pipe communicates with the upstream branch on the upstream side of the orifice and the downstream end of the winding pipe communicates with the downstream branch on the downstream side of the orifice, part of the fluid to be heated flowing in the inlet pipe or the outlet pipe can be smoothly diverted to the winding pipe. Further, according to the heat source device above, the fluid to be heated diverted from the inlet pipe or the outlet pipe returns to the same inlet pipe or the same outlet pipe. Therefore, all the fluid to be heated flowing in the inlet pipe flows into the heat exchanger. Thereby, even when a required flow rate is small, shortage of a flow rate of the fluid to be heated in the heat exchanger can be prevented.

Further, according to the heat source device above, all the fluid to be heated flowing through the inlet pipe is heated by the heat exchanger. Therefore, unlike the case where part of a fluid to be heated flowing in the inlet pipe is diverted from the inlet pipe to the outlet pipe by bypassing the heat exchanger, there is no need to heat the fluid to be heated in the heat exchanger to a temperature higher than a temperature required for the heat source device.

Further, a temperature of the fluid to be heated flowing in the inlet pipe or the outlet pipe is lower than a temperature of the peripheral wall of the combustion chamber in which high temperature combustion exhaust gas flows. This can suppress overheating of the peripheral wall of the combustion chamber, and can heat the fluid to be heated flowing in the winding pipe efficiently. Especially, when the upstream and downstream ends of the winding pipe communicate with the inlet pipe, part of the lower temperature fluid before being heated by the heat exchanger flows through the winding pipe. Therefore, this can effectively suppress overheating of the peripheral wall of the combustion chamber. On the other hand, when the upstream and downstream ends of the winding pipe communicate with the outlet pipe, part of the fluid to be heated heated by the heat exchanger is diverted to the winding pipe, and the diverted fluid is heated while flowing in the winding pipe. Therefore, the fluid to be heated can be efficiently heated.

Preferably, in the heat source device above, the heat exchanger has a plate-type heat exchanger formed by stacking a plurality of heat exchange units in a gas flow direction of the combustion exhaust gas, and each of the heat exchange units includes an internal space in which the fluid to be heated flows.

In the plate-type heat exchanger above, the heat exchange unit located on a most upstream side of the gas flow passage of the combustion exhaust gas is in contact with the hottest combustion exhaust gas. Therefore, local heating tends to occur in a most upstream heat exchange unit. However, according to the heat source device above, all the fluid to be heated supplied to the inlet pipe flows into the heat exchanger. Therefore, the shortage of the flow rate of the fluid to be heated flowing in the most upstream heat exchange unit can be securely prevented.

Preferably, the heat source device further comprises a drain receiver connected to the heat exchanger, wherein the burner has a downward combustion surface, the burner, the combustion chamber, the heat exchanger, and the drain receiver are disposed in order from a top, the inlet pipe and the outlet pipe protrude downward from the heat exchanger through the drain receiver, the upstream end of the winding pipe communicates with the upstream branch provided on the inlet pipe or the outlet pipe protruding downward from the drain receiver, and the downstream end of the winding pipe communicates with the downstream branch provided on the inlet pipe or the outlet pipe protruding downward from the drain receiver.

When the combustion exhaust gas comes into contact with a low temperature member, acidic drain is generated by condensing moisture in the combustion exhaust gas. On the other hand, in the heat source device above, the burner, the combustion chamber, the heat exchanger, and the drain receiver are disposed in order from the top and the inlet pipe and the outlet pipe protrude downward from the heat exchanger through the drain receiver. Therefore, the drain is generated not only when the combustion exhaust gas passes through the heat exchanger but when the combustion exhaust gas passing through the heat exchanger comes into contact with the inlet pipe and the outlet pipe. As a result, the generated drain flows downward along outer surfaces of the inlet pipe and the outlet pipe, the drain retains in penetrating portions of the drain receiver through which the inlet pipe and the outlet pipe penetrate, and corrosion of the drain receiver tends to occur.

However, according to the heat source device, when the upstream and downstream ends of the winding pipe communicate with the inlet pipe, the upstream and downstream ends of the winding pipe respectively communicate with the upstream branch and the downstream branch protruding to the outside from the drain receiver. Therefore, the fluid to be heated after joining the fluid passing through the orifice and the fluid heated by the winding pipe flows in the inlet pipe between the heat exchanger and the drain receiver. Thereby, a temperature of the inlet pipe becomes high, which results in reducing the drain generated when the combustion exhaust gas comes into contact with the inlet pipe and the outlet pipe. On the other hand, when the upstream and downstream ends of the winding pipe communicate with the outlet pipe, the fluid after being heated by the heat exchanger flows in the winding pipe. This can suppress dew condensation generated on an outer side of an outer surface of the winding pipe.

As described above, according to the present invention, since all the fluid to be heated flowing in the inlet pipe flows into the heat exchanger, the local heating in the heat exchanger can be prevented.

The present application claims a priority based on a Japanese Patent Application No. 2018-234021 filed on Dec. 14, 2018, the content of which is hereby incorporated by reference in its entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:

1. A heat source device comprising:
a burner for generating combustion exhaust gas;
a heat exchanger through which the combustion exhaust gas flows;
a combustion chamber provided between the burner and the heat exchanger;
an inlet pipe for allowing a fluid to be heated to flow in the heat exchanger;
an outlet pipe for allowing the fluid to be heated to flow out from the heat exchanger; and
a winding pipe wound around an outer surface of a peripheral wall of the combustion chamber,
wherein either the inlet pipe or the outlet pipe has an orifice configured to throttle a fluid flow path of the fluid to be flowing in the inlet pipe or the outlet pipe,
an upstream end of the winding pipe communicates with an upstream branch provided on an upstream side of the orifice in the inlet pipe or the outlet pipe, and
a downstream end of the winding pipe communicates with a downstream branch provided on a downstream side of the orifice in the inlet pipe or the outlet pipe.

2. The heat source device according to claim 1,
wherein the heat exchanger has a plate-type heat exchanger formed by stacking a plurality of heat exchange units in a gas flow direction of the combustion exhaust gas,
wherein each of the heat exchange units includes an internal space in which the fluid to be heated flows.

3. The heat source device according to claim 1, further comprising a drain receiver connected to the heat exchanger,
wherein the burner has a downward combustion surface,
the burner, the combustion chamber, the heat exchanger, and the drain receiver are disposed in order from a top,
the inlet pipe and the outlet pipe protrude downward from the heat exchanger through the drain receiver,
the upstream end of the winding pipe communicates with the upstream branch provided on the inlet pipe or the outlet pipe protruding downward from the drain receiver, and
the downstream end of the winding pipe communicates with the downstream branch provided on the inlet pipe or the outlet pipe protruding downward from the drain receiver.

* * * * *